United States Patent

McCreary

[11] Patent Number: 5,152,311
[45] Date of Patent: Oct. 6, 1992

[54] METHOD FOR PREVENTING FLUID FROM REACHING A PORTION OF A PIPE

[75] Inventor: Robert L. McCreary, Pittsburgh, Pa.
[73] Assignee: Timothy McCreary, Pittsburgh, Pa.
[21] Appl. No.: 389,044
[22] Filed: Aug. 3, 1989
[51] Int. Cl.⁵ ............................................. F16L 55/18
[52] U.S. Cl. ............................................. 137/15; 138/89; 138/97; 228/119; 228/214
[58] Field of Search .................. 138/89, 93, 94, 90, 138/97; 4/295; 166/185, 187, 202; 228/119, 214; 137/1, 15; 29/213.1

[56] References Cited

U.S. PATENT DOCUMENTS

| | | | |
|---|---|---|---|
| 402,600 | 5/1889 | Kemp | 138/90 |
| 491,184 | 2/1893 | McCartney | 138/89 |
| 705,059 | 7/1902 | Flynn | 138/90 |
| 739,589 | 9/1903 | Clifford | 138/90 |
| 834,393 | 10/1906 | Meister | 138/90 |
| 922,544 | 5/1909 | Turner et al. | 138/90 |
| 966,748 | 8/1910 | Honecker | 138/90 X |
| 1,226,209 | 5/1917 | Harris | 138/89 |
| 1,747,933 | 2/1930 | Goodman et al. | 138/94 |
| 1,808,411 | 6/1931 | Hinkston | 138/90 |
| 1,993,307 | 5/1935 | Nicholson | 138/89 |
| 2,375,995 | 5/1945 | Kaeser | 138/90 |
| 2,512,801 | 6/1950 | Kinney et al. | 166/185 |
| 2,707,387 | 5/1955 | Zinn | 138/89 |
| 2,886,067 | 5/1959 | Maxwell et al. | 138/90 |
| 3,760,878 | 9/1973 | Peevey | 166/185 |
| 3,993,103 | 11/1976 | Hammer | 138/89 |
| 4,529,007 | 7/1985 | Goforth | 138/89 |
| 4,589,446 | 5/1986 | Allen | 138/97 |

Primary Examiner—Harvey C. Hornsby
Assistant Examiner—C. Cooley
Attorney, Agent, or Firm—Ansel M. Schwartz

[57] ABSTRACT

The present invention is a method for preventing fluid from reaching a portion of a pipe to permit soldering of a threaded adaptor or valve onto the pipe. The method includes the first step of inserting a hollow member through the adaptor or valve. Next, there is the step of inserting the hollow member with an expansion sleeve into the pipe. Then, there is the step of expanding the expansion sleeve such that the expansion sleeve forms a seal in the pipe and fluid from a fluid source upstream of the sleeve is diverted through the hollow member past the portion of the pipe and soldering the threaded adaptor or valve onto the portion of the pipe. The present invention is also a method for preventing water from reaching a portion of a pipe to permit soldering of a threaded adaptor or valve onto the pipe. The method includes the first step of inserting a hollow member through the threaded adaptor or valve. Next, there is the step of inserting the hollow member with an expansion sleeve into the pipe. Then, there is the step of expanding the expansion sleeve such that the expansion sleeve forms a seal in the pipe and water is diverted through the hollow member past the portion of the pipe and soldering said threaded adaptor or valve onto the portion of the pipe.

2 Claims, 2 Drawing Sheets

METHOD FOR PREVENTING FLUID FROM REACHING A PORTION OF A PIPE

FIELD OF THE INVENTION

The present invention is related to an apparatus for preventing fluid from reaching a portion of a pipe. More specifically, the present invention is related to an apparatus which prevents fluid from reaching a portion of a pipe by transporting the fluid past the portion of the pipe without it contacting the portion of the pipe.

BACKGROUND OF THE INVENTION

Pipes or tubes which transport fluid, such as water, are common indispensable features in all modern day building structures. Situations arise, where for one reason or another, the existing piping must have a valve added to it, or additional pipe connected to it. Typically, this requires soldering to be utilized to realize the given addition to the existing pipe. However, as is well known, if there is any water present at the soldering site, the soldering is very difficult if not impossible to accomplish. In instances where water cannot be easily shut off, various techniques have been tried, such as plugging up the pipe upstream of the opening, however, water usually leaks through the plug and reaches the soldering site. The present invention prevents fluid from reaching a portion of a pipe, so, for instance, soldering can be accomplished. It accomplishes this not by stopping the fluid, but transporting the fluid past the soldering site without it contacting the soldering site. For instance, an adapter or certain gate valves, or certain ball valves can then be slipped onto the invention and into the tubing. The joint is now dry and can be soldered.

SUMMARY OF THE INVENTION

The present invention is a method for preventing fluid from reaching a portion of a pipe to permit soldering of a threaded adaptor or valve onto said pipe. The method includes the first step of inserting a hollow member through said adaptor or valve. Next, there is the step of inserting said hollow member with an expansion sleeve into the pipe. Then, there is the step of expanding the expansion sleeve such that the expansion sleeve forms a seal in the pipe and fluid from a fluid source upstream of the sleeve is diverted through the hollow member past the portion of the pipe and soldering said threaded adaptor or valve onto said portion of the pipe.

The present invention is also a method for preventing water from reaching a portion of a pipe to permit soldering of a threaded adaptor or valve onto said pipe. The method includes the first step of inserting a hollow member through said threaded adaptor or valve. Next, there is the step of inserting said hollow member with an expansion sleeve into the pipe. Then, there is the step of expanding the expansion sleeve such that the expansion sleeve form a seal in the pipe and water is diverted through the hollow member past the portion of the pipe and soldering said threaded adaptor or valve onto said portion of the pipe.

BRIEF DESCRIPTION OF THE DRAWINGS

In the accompanying drawing, the preferred embodiments of the invention and preferred methods of practicing the invention are illustrated in which.

DESCRIPTION OF THE PREFERRED EMBODIMENT

Figure 1:
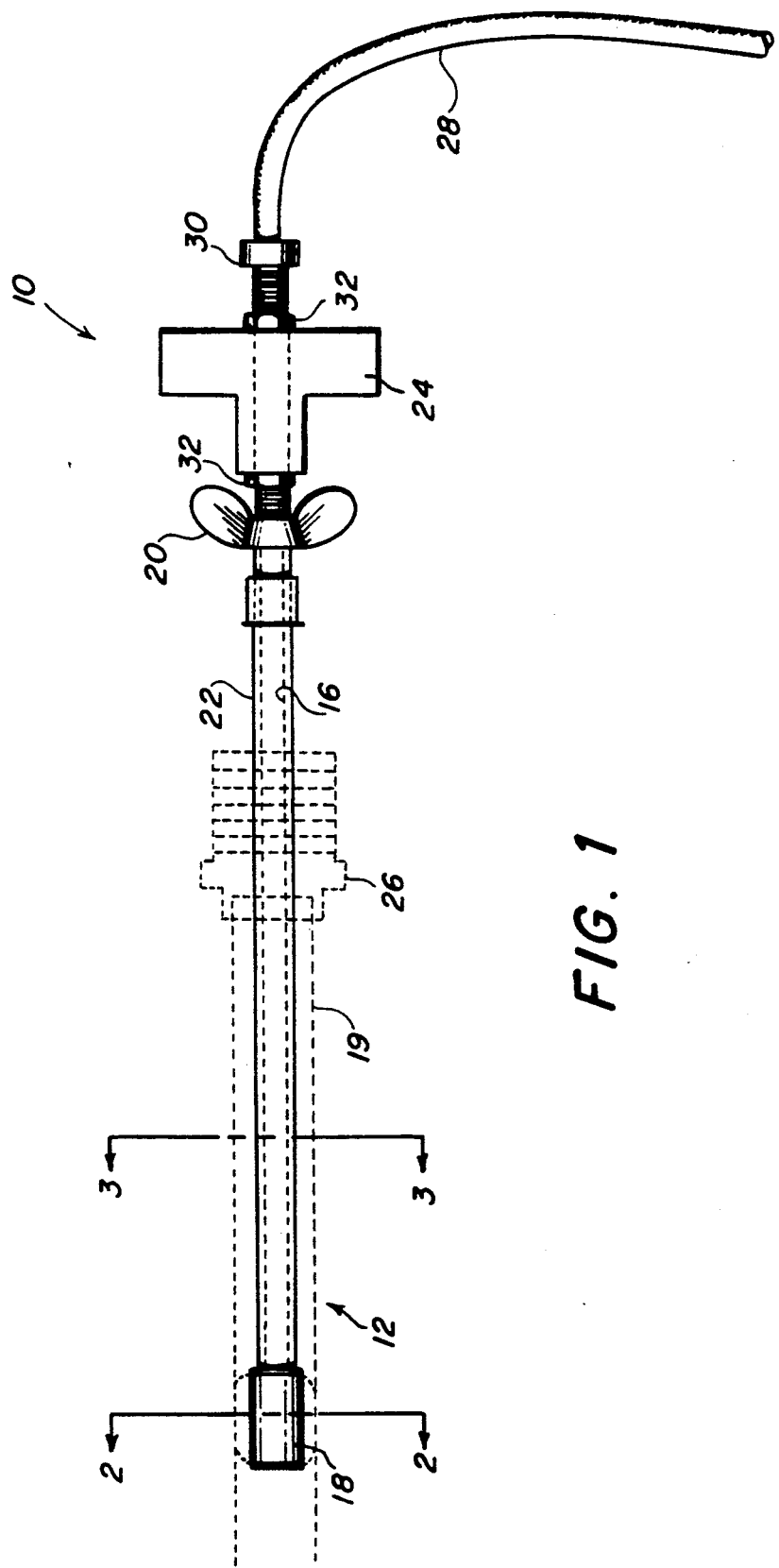
FIG. 1 is a schematic representation of an apparatus for preventing fluid from reaching a portion of a pipe.
Figure 2:
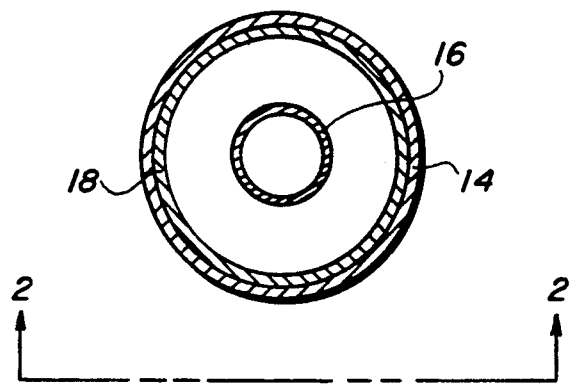
FIG. 2 is a cross-sectional view of a portion of FIG. 1 taken along the line 2—2.
Figure 3:
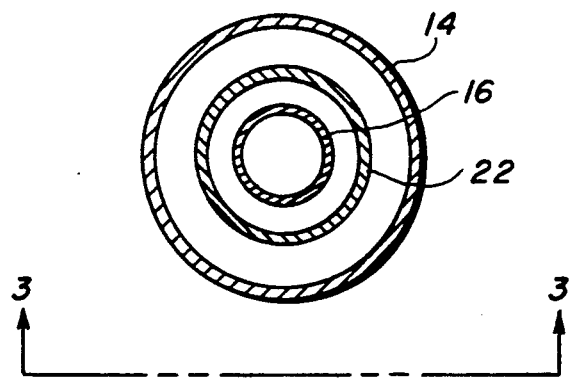
FIG. 3 is a cross-sectional view of a portion of FIG. 1 taken along the line 3—3.

Referring to FIG. 1, there is shown a schematic representation of an apparatus 10 for preventing fluid from reaching a portion 12 of a pipe 14. The apparatus 10 is comprised of a hollow member 16 that has a diameter smaller than the diameter of the pipe 14. The hollow member 16 is preferably a copper tube or any nonferous metal.

The apparatus 10 is also comprised of an expandable sleeve 18 positioned about the hollow member 16 which has an unexpanded state with a diameter less than the diameter of the pipe 14, and an expanded state that has a diameter which is essentially equal to the diameter of the pipe 14. In the expanded state, the expansion sleeve 18 forms a seal between the pipe 14 and the hollow member 16 so fluid in the pipe 14 is diverted through the hollow member 16 past the portion of the pipe 14. The expansion sleeve 18 is preferably a rubber expansion sleeve 18.

The apparatus 10 is additionally comprised of means 20 for controlling the state of the expansion sleeve 18. Preferably, the controlling means includes a wing nut 20 or other method of compression threaded on the hollow member 16, and a second member 22 positioned about the hollow member 16 between the wing nut 20 and the expandable sleeve 18 such that by rotating the wing nut 20 in the proper direction, the second member 22 is moved against the expandable sleeve 18 causing it to expand. The second member 22 is preferably a second copper tube.

The apparatus 10 can include a handle 24 positioned about the hollow member 16 adjacent the wing nut 20. The handle 24 facilitates the use of the apparatus 10 in a pipe 14 by a user.

In the operation of the preferred embodiment, a pipe 14 of copper tubing is cut in order for a threaded adapter 26 to be installed on the pipe 14. The threaded adapter or valve is then placed on the pipe 14 in order for it to be soldered thereon. The apparatus 10 is inserted into the pipe 14 such that the rubber expansion sleeve 18 of the apparatus 10 is sufficiently upstream from a portion 12 of the pipe 14 where a threaded adapter 26 is to be soldered on the pipe 14 and then a valve can be installed on a threaded adapter to shut the water off completely.

The wing nut 20 of the apparatus 10 is rotated such that the second member 22 disposed between the wing nut 20 and the rubber expansion sleeve 18, and positioned about the hollow member 16, is moved towards the rubber expansion sleeve 18. The movement of the second member 22 towards the rubber expansion sleeve 18 results in the rubber expansion sleeve 18 expanding in diameter. The wing nut 20 is continually rotated until the rubber expansion sleeve 18 forms a seal in the pipe 14. Water in the pipe 14 is then prevented from passing into the portion 12 of the pipe 14 where the threaded adapter 26 is to be soldered thereon. Instead, the water is diverted into the hollow member 16 where it is transported past the portion 12 into water flow tubing 28 where it is carried to some desired location for removal.

The water flow tubing 28 is attached to the hollow member 16 with a compression nut 30.

The threaded adapter 26 or gate valve, or ball valve which the hollow member 16 and the rubber expansion sleeve thereof has been inserted through is then soldered in place onto the piping 14. Once the soldering is complete, the apparatus 10 is removed by the user moving the second member 22 away from the rubber expansion sleeve 18 such that its diameter is lessened enough for it to slide out, then the user grabs the handle 24 which is held in place in the hollow member 16 by lock nuts 32 and slides the apparatus 10 out of the pipe 14.

In the preferred embodiment, the pipe 14 has an inside diameter of ½ of an inch and the apparatus has an overall length from the end of the lock nut 32 to the end of the rubber expansion sleeve 18 of 11 inches. Although the dimensions of the apparatus can be any size that the circumstances dictate in order to accomplish the desired result. The rubber expansion sleeve is ⅜ of an inch in its unexpanded state and ⅝ of an inch in its expanded state. The length of the rubber expansion sleeve 18 is 9/16 of an inch. The diameter of the hollow member is ¼ of an inch with a diameter of the second member 22 being slightly larger than ¼ of an inch. The length of the second member is 6 inches.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for preventing fluid from reaching a portion of a pipe to permit soldering of a threaded adaptor or valve onto said pipe comprising the steps of inserting a hollow member through said adaptor or valve, inserting said hollow member with an expansion sleeve into the pipe;

expanding the expansion sleeve such that the expansion sleeve forms a seal in the pipe and fluid from a fluid source upstream of the sleeve is diverted through the hollow member past the portion of the pipe and soldering said threaded adaptor or valve onto said portion of the pipe.

2. A method for preventing water from reaching a portion of a pipe to permit soldering of a threaded adaptor or valve onto said pipe comprising the steps of inserting a hollow member through said threaded adaptor or valve, inserting said hollow member with an expansion sleeve into the pipe;

expanding the expansion sleeve such that the expansion sleeve forms a seal in the pipe and water is diverted through the hollow member past the portion of the pipe and soldering said threaded adaptor or valve onto said portion of the pipe.

* * * * *